US 6,560,126 B1

(12) United States Patent
Le et al.

(10) Patent No.: US 6,560,126 B1
(45) Date of Patent: May 6, 2003

(54) TELECOMMUNICATIONS PROTECTOR PANEL FOR HIGH FREQUENCY TRANSMISSION

(75) Inventors: Tuan Le, Richland Hills, TX (US); K. Erin Blake, Watauga, TX (US); Guy Castonguay, Ft. Worth, TX (US); Josh M. Wilken, Ft. Worth, TX (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/374,772

(22) Filed: Aug. 16, 1999

(51) Int. Cl.[7] ................................................ H04M 1/00
(52) U.S. Cl. ...................... 361/826; 379/417; 439/922; 439/941
(58) Field of Search .......................... 439/49, 54, 922; 379/327, 397, 437, 438, 417; 361/826, 824; 174/27, 34, 33

(56) References Cited

U.S. PATENT DOCUMENTS

| | | | | |
|---|---|---|---|---|
| 3,760,328 A | * | 9/1973 | Georgopulos | 379/327 |
| 4,058,669 A | * | 11/1977 | Nutt et al. | 174/34 |
| 4,782,427 A | * | 11/1988 | Marks | |
| 4,873,393 A | * | 10/1989 | Friesen et al. | 174/34 |
| 5,178,554 A | * | 1/1993 | Siemon | 439/676 |
| 5,496,191 A | * | 3/1996 | Johnston | 439/404 |
| 6,096,977 A | * | 8/2000 | Beggs | 174/113 R |
| 6,151,392 A | * | 11/2000 | Castonguay et al. | 379/437 |
| 6,438,226 B1 | * | 8/2002 | Guenther | 379/413.04 |

* cited by examiner

Primary Examiner—Neil Abrams
(74) Attorney, Agent, or Firm—Christopher C. Dremann

(57) ABSTRACT

A protector panel for telecommunication wires has a plurality of rows of sockets. Each of the sockets has two pairs of receptacles for receiving pins of a plug-in excess voltage protector module. Rows of pins protrude from the back of the panel, each of the pins registering with one of the receptacles so as to provide two pairs of pins for each socket pattern. A pair of outside-plant wires extends from one of the pairs of pins of each socket pattern. Similarly, a pair of customer premises wires extends from the other of the pairs of each socket pattern. The pairs of wires are twisted substantially along their entire length. The amount of twist of at least some of the pairs of the outside-plant wires within each row differs from the amount of twist of at least some of the other pairs of outside-plant wires. Similarly, the amount of twist of the customer premises wires also differs from others in the same row. Further, the twisted pairs that are adjacent each other, but in different rows, will have different pitches. The differences in the amounts of twist of the pairs of wires enable the protector panel to handle high frequency transmissions while minimizing cross talk.

12 Claims, 3 Drawing Sheets

TELECOMMUNICATIONS PROTECTOR PANEL FOR HIGH FREQUENCY TRANSMISSION

BACKGROUND

This invention relates to a protector panel assembly for telecommunication connections for protecting against high voltages and surge currents, particularly for a protector panel assembly for use at high frequency telecommunications.

Telecommunication lines within, for example, a telephone system or data system should be protected from high voltages and surge currents that may occur on the lines. Such voltages and currents may damage telecommunications equipment to which the lines are coupled and pose a safety hazard to people using the equipment. Each telecommunication line is comprised of a twisted-pair of wires. For business uses, norm-ally,.each twisted-pair of wires-extends into a protector panel that is capable of handling a number of lines. The protector panel has a plurality of rows of sockets on a front side of the panel, each of the sockets having two pairs of receptacles for receiving pins of a plug-in excess voltage module. In the event of a high surge current or excessive voltage occurring, the module conducts to ground to protect equipment and personnel. Twisted pairs of wires leading from a telecommunications provider outside of the facility, referred to herein as "outside-plant" wires, connect to the protector panel assembly. Wires leading from the protector panel to the equipment within the customer premises are referred to herein as "customer premises" wires.

Protector panels are constructed to occupy a minimal amount of space while serving a large number of twisted-pair lines. On the back side of the panel, a plurality of rows of pins protrude, each of the pins registering with one of the receptacles to provide a socket pattern with two pairs of pins for each socket. A ground bar extends between the pins on each row. A back portion of an outside plant connector block and a customer premises connector block are located on opposite sides of the rows of pins. The outside-plant connector block has a plurality of terminals that are electrically connected to wires of an outside plant cable, such as ones coming from a telephone company. The customer premises connector block also has terminals that are electrically connected to wires that are leading to the customer's equipment. Jumper wires extend from a pair of pins of each socket pattern to the outside-plant connector block. Similarly, jumper wires extend from the other pair of pins of each of the socket patterns to the customer premises connector block.

The outside-plant cable comprises a bundle of twisted pair wires within an elastomeric sheath. The twisting is known to reduce cross-talk between wires. Cross talk is an unwanted signal coupling between two or more pairs of wires. Typically, cross talk occurs between wires that are physically close to one another. The strength of the interference or cross talk is directly proportional to the square of the distance. In some cable bundles, the amount of twist per inch, or pitch, varies among the twisted pairs, particularly among the twisted-pairs in the bundle that are in close proximity to each other. However, in the prior art, the jumper wires extending between the pins and the customer premises and outside-plant connector blocks are not twisted.

While this type of protector panel has been suitable in the past for voice communication, say 300Hz to 3.5 KHz, these panels are not acceptable in very high frequency applications. For digital communication, the frequency may be as high as 100 MHZ. Cross talk may occur with prior art panels at very high frequency, particularly if there are a number of wires crowded into limited space on the back of the protector panel.

SUMMARY OF THE INVENTION

The protector panel of this invention has a plurality of rows of sockets on a front side of the panel. Each of the sockets has two pairs of receptacles and a ground receptacle for receiving pins of a plug-in excess voltage module. A plurality of rows of pins protrude from a back side of the panel. Each of the pins registers with one of the receptacles to provide two pairs of pins for each socket pattern.

A pair of outside-plant wires extend from one of the pairs of pins of each socket pattern. Each of the pair of wires is twisted substantially along its entire length. The amount of twist of at least some of the pairs of outside-plant wires within each row differ from the amount of twist of at least some of the other pairs of outside-plant wires within the same row. Similarly, a twisted-pair of customer premises wires extend from the other pair of pins of each socket pattern. The amount of twist of at least some of the pairs of customer premises wires within each row differ from the amount of twist of at least some of the other pairs of customer premises wires within the same row. Furthermore, in the preferred embodiment, the pitches of the outside-plant and customer premises wires leading to pins of adjacent socket patterns in adjacent rows differs from one another. The difference in pitch between adjacent socket patterns in adjacent rows is preferably greater than the difference in pitch between socket patterns within the same row. The outside-plant and customer premises wires for each of the socket patterns extend away from each other, rather than overlying each other to further avoid cross talk.

DETAILED DESCRIPTION OF THE INVENTION

Figure 1:
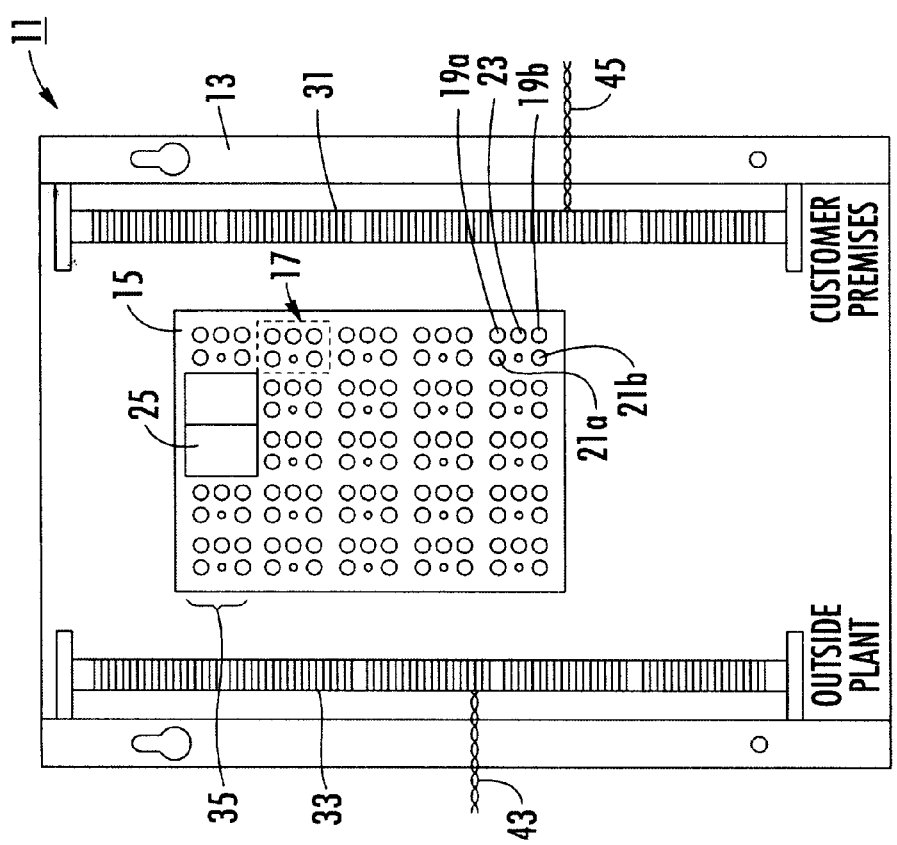
FIG. 1 is a front elevational view of a protector panel constructed in accordance with this invention an showing two plug-in excess voltage modules.

Referring to FIG. 1, protector panel assembly 11 includes a base or housing 13 that is adapted to mount to a wall within a building. Housing 13 supports a panel 15 that has a plurality of sockets 17. In this embodiment, each socket 17, as indicated by the dotted lines, comprises a group of five receptacles, including a pair of customer premises tip and ring receptacles 19a, 19b, a pair of outside-plant tip and ring receptacles 21a, 21b and a ground receptacle 23. Signals to and from the telecommunications provider pass along tip and ring lines to outside plant receptacles 21a, 21b. Signals to and from the customer premises equipment pass along tip and ring lines to customer premises receptacles 19a, 19b.

Figure 2:
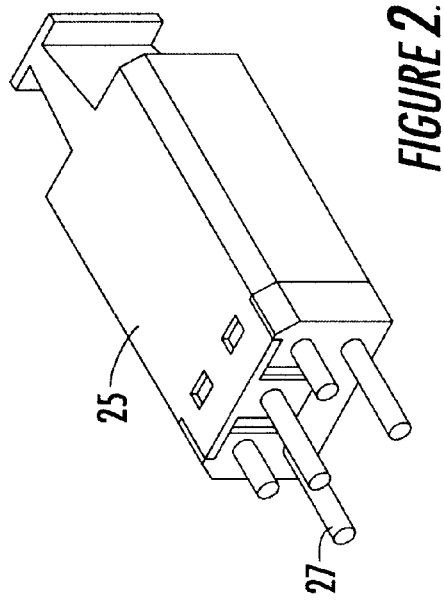
FIG. 2 is an enlarged perspective view of one of the plug-in excess voltage modules shown in FIG. 1.

Referring to FIG. 2, a protector module 25 has five pins 27 that fit into the receptacles 19a, 19b, 21a, 21b, and 23 of each socket 17. Protector module 25 has one or more protector elements within it. In the embodiment shown, there are two protector elements, each connected between the outside-plant receptacles 21a, 21b and ground 23 (FIG. 1) once plugged into socket 17. The protector elements preferred for high frequency applications are of a known gas tube type but solid state protectors are also employed. Module 25 also has a line within it that will interconnect tip outside-plant receptacle 21a with tip customer premises receptacle 19a once plugged into socket 17. Similarly, module 25 has a line that interconnects ring outside-plant receptacle 21b with ring customer premises receptacle 19b. If excess voltage or a current surge occurs on either the outside-plant lines or the customer premises lines, then one or both protector elements of module 25 will conduct to ground to avoid further damage.

An outside plant connector block 33 has a front portion mounted to the face of protector panel assembly 11 on one side of panel 15. A customer premises connector block 31 has a front portion located on the opposite side of panel 15. Each connector block 31, 33 comprises a number of terminals for connecting to outside-plant and customer premises lines. There are various types of connectors 31, 33. Generally, they will be elongated strips that are parallel to each other and parallel to two sides of panel 15.

Sockets 17 are arranged in parallel rows 35. In the particular panel 15 shown, each row 35 has five sockets 17, and there are five rows 35, resulting in twenty-five sockets 17. Within each row 35, sockets 17 are spaced apart from each other a distance slightly more than a distance from outside-plant receptacles 21a,b to customer premises receptacles 19a,b within each socket. Also, the distance between rows 35 is only slightly more than a distance from outside-plant receptacles 21a,b to customer premises receptacles 19a,b within each socket 17.

Figure 3:
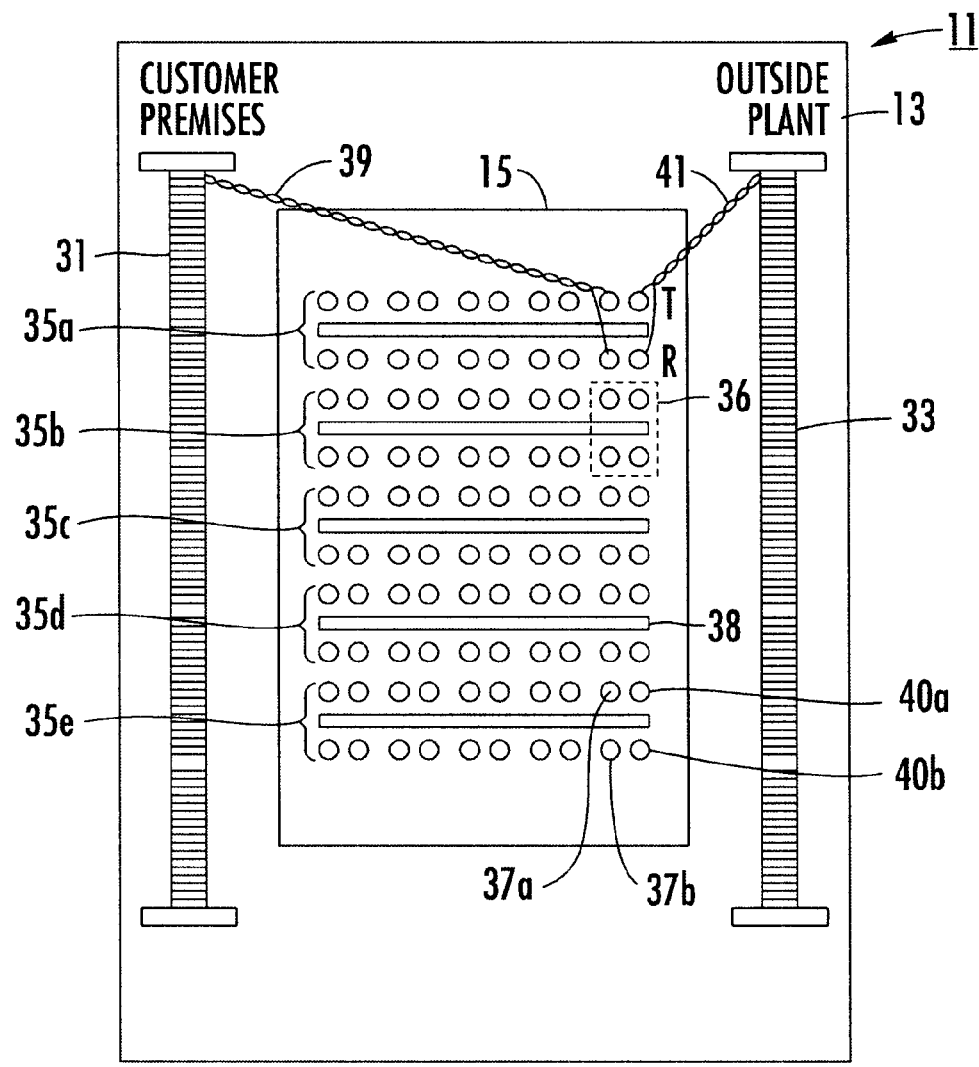
FIG. 3 is a back elevational view of the protector panel of FIG. 1.

The back of protector panel assembly 11 is shown in FIG. 3. Panel 15 locates within a rectangular aperture in housing 13, thus is exposed on the back side. The back portions of connector blocks 31, 33 protrude through slots in housing 13. Each connector block 31, 33 has terminals that are accessible from the back, these terminals being in electrical continuity with terminals shown in FIG. 1 on the front of panel assembly 11. A plurality of outside-plant pins 40a,b protrude from the back side of panel 15. Each outside-plant pin 40a,b is electrically connected with one of the outside-plant receptacles 21a or 21b (FIG. 1). A plurality of customer premises pins 37a,b also protrude from the back side of panel 15. Each customer premises pin 37a,b is electrically connected with one of the customer premises receptacles 19a or 19b. Pins 37a,b and 40a,b are arrayed in separate socket patterns 36 that match sockets 17 (FIG. 1). Each socket pattern 36 has two outside-plant pins 40a, 40b for tip and ring and two customer premises pins 37a, 37b for tip and ring. Each socket pattern 36 is arrayed in one of the rows 35a–e. A ground bar 38 extends along each row 35a–e, the ground bar 38 being connected to the ground receptacles 23 (FIG. 1) of all of the sockets 17 within that particular row 35.

A plurality of outside-plant twisted wire-pairs 41 (only one shown), referred to herein as jumpers, lead from outside-plant connector block 33 to outside-plant pins 40a,b of each row 35a–e. A plurality of customer premises twisted wire-pairs 39 lead from the terminals of customer premises connector block 31 to the customer premises pins 37 of each row 35a–e. Each jumper 39 comprises two wires, one for tip and the other for ring.

Figure 4:
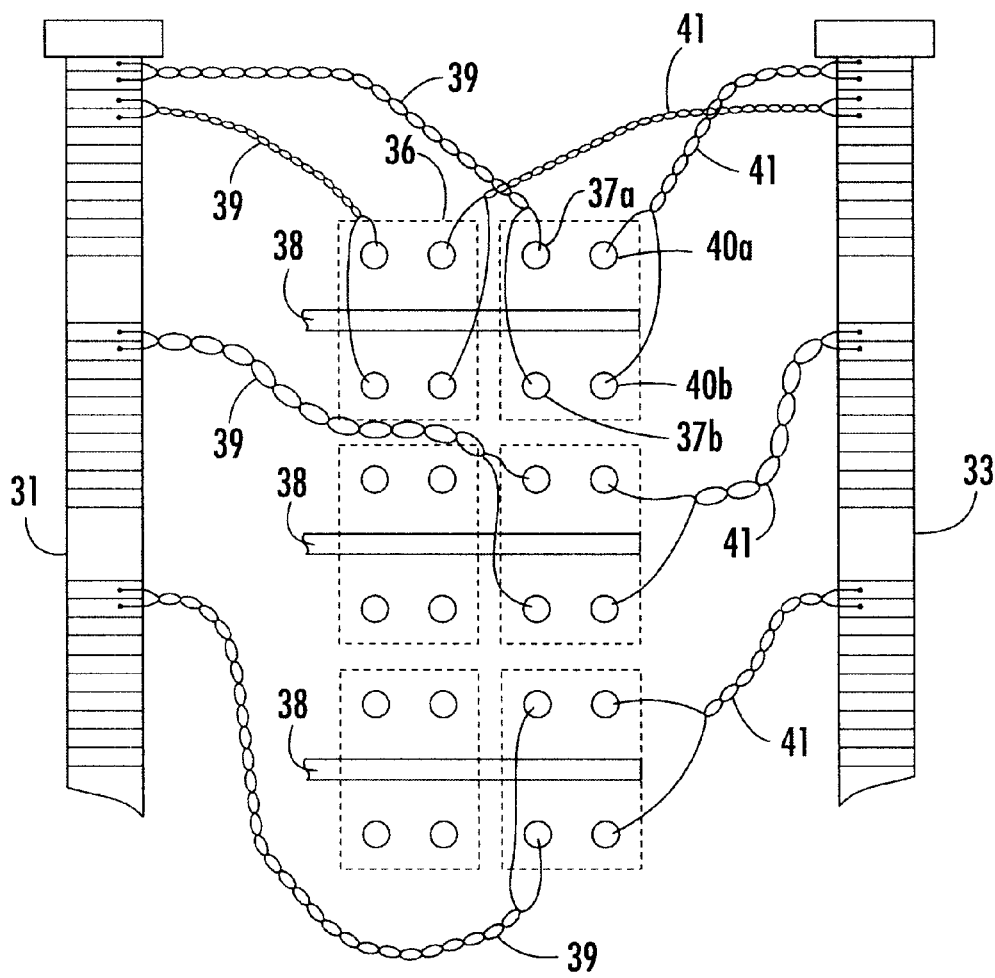
FIG. 4 is an enlarged schematic view illustrating a portion of the back of the connector panel shown in FIG. 3, with only two twisted-pairs of wires shown.

Referring now to FIG. 4, the ring wire of each outside-plant jumper 41 connects to one of the outside-plant side pins 40b while the tip wire within the same jumper 41 connects to one of the outside-plant pins 40a of the same socket pattern 36. Similarly, the ring wire of each customer premises jumper 39 connects to one of the customer premises pins 37b while the tip wire of the same customer premises jumper 39 is joined to the customer premises pin 37a of the same socket pattern 36.

Each wire of each jumper 39, 41 is twisted with its mating wire in the pair substantially along its entire length from pins 37, 40 to terminals of connector blocks 31, 33. There should be no more than about ½" to 1", preferably no more than ½", of untwisted portion of each twisted pair 39, 41 at the pins 37, 40. Also, the amount of twist or pitch varies within each row 35a–e. Preferably, the amount of twist for all of the jumpers 39, 41 is within the range from 5.0 to 7.25 twists per inch. Preferably, the pitch within a particular row 35 varies so that jumpers 39, 41 joined to adjacent socket patterns 36 within the same row 35 will differ from each other by at least ¼ twist per inch. Furthermore, it is preferred that the jumpers 39, 41 leading to socket patterns 36 that are adjacent socket patterns 36 of adjacent rows differ from one another in pitch by an amount that is greater than the difference within the same row 35. For example, in one embodiment, the customer premises jumper 39 leading to the first socket pattern 36 on the right in row 35a has a pitch of 6.0 twists per inch, while the customer premises jumper 39 leading to the first socket pattern 36 on the right in row 35b has a pitch of 5.0 twist per inch. This is a difference of 1.0 twist per inch. On the other hand, in the same embodiment, the customer premises jumper 39 of the second from the right socket pattern 36 in row 35a has a pitch of 6.25 twists per inch, differing only ¼ twist per inch from the pitch of the customer jumper 39 leading to the first socket pattern 36 on the right in row 35a. It is preferred that the outside-plant jumper leading to one socket pattern 36 have the same pitch as the customer premises jumper 39 leading to the same socket pattern 36. The table below illustrates the pitch of both outside-plant and customer premises jumpers 41, 39 of a preferred embodiment for a 25 socket protector panel 11.

| Socket Pattern | Row 35a | Row 35b | Row 35c | Row 35d | Row 35e |
|---|---|---|---|---|---|
| 1st Socket | 6.00 | 5.00 | 6.00 | 5.00 | 6.00 |
| 2nd Socket | 6.25 | 5.25 | 6.25 | 5.25 | 6.25 |
| 3rd Socket | 6.50 | 5.50 | 6.50 | 5.50 | 6.50 |
| 4th Socket | 6.75 | 5.75 | 6.75 | 5.75 | 6.75 |
| 5th Socket | 7.25 | 6.00 | 7.25 | 6.00 | 7.25 |

As can be seen from the table, the pitch progression in each row 35 does not have to be entirely different from the others. Rows 35a, 35c and 35e have the same pitch progression from the $1^{st}$ socket through $5^{th}$ socket, that pitch progression being from 6.00 to 7.25 twists per inch. Rows 35a, 35c and 35e are not adjacent to each other. Rows 35b and 35d have pitch progressions that differ from adjacent rows 35a, 35c and 35e, but not from each other. The pitch progressions of rows 35b and 35d vary from 5.00 to 6.00 from the $1^{st}$ socket to the $5^{th}$ socket. Consequently, any particular socket pattern 36 within any row 35 will differ from any adjacent socket pattern in an adjacent row by a pitch that preferably is at least one twist per inch. For example, the $3^{rd}$ socket pattern of row 35c has a pitch of 6.50 twists per inch, while adjacent $3^{rd}$ socket patterns in rows 35b and 35d have pitches of 5.50 twists per inch. As mentioned above, the difference in pitch of adjacent socket patterns 36 within a particular row 35 need not be as great, but preferably is at least ¼ twist per inch.

Referring again to FIG. 4, the outside-plant jumpers 41 for a particular socket pattern 36 extend in an opposite direction and do not overlie the customer premises jumpers 39 for the same socket pattern 36. By being careful not to overlie one another, cross talk is minimized.

The protector panel assembly 11 will be assembled by installing jumpers 39, 41 at the factory in the manner discussed. The amount of twist will be varied within the rows 35a–e, as well as between adjacent socket patterns 36 in adjacent rows. In use, the protector panel assembly 11 will be mounted within a building. An incoming or outside-plant cable having twisted-pairs 43 (FIG. 1) will be connected to the front side of outside-plant connector block 33. Once connected, each twisted-pair 43 of the outside-plant cable will be electrically connected to one of the outside-plant jumpers 41. Similarly, each twisted-pair 45 (FIG. 1) leading to the customer premises equipment, will be connected through the front side of customer premises connector block 31 to one of the customer premises jumpers 39. Modules 25 are inserted into sockets 17 as shown in FIG. 1. This electrically connects the outside-plant jumpers 41 with the customer premises jumpers 39. If a current or high voltage surge occurs, either on the customer premises or outside-plant side, one or both of protector elements in protector modules 25 will conduct to ground and reduce the chances for damaging the equipment.

The invention has significant advantages. The protector panel is able to meet high frequency specifications, allowing it to handle high frequency transmission while minimizing cross talk. The protector panel is able to meet Category 5 specifications for high frequency telecommunications, TIA/EIA 568A.

While the invention has been shown in only one of its forms, it should be apparent to those skilled in the art that it is not so limited, but is susceptible to various improvements without departing from the scope of the invention.

We claim:

1. In a protector panel for telecommunication wires having a plurality of rows of sockets on a front side of the panel, each of the sockets adapted to receive a protector module, a plurality of rows of pins protruding from a back side of the panel, the pins being arranged in pairs within socket patterns corresponding to the sockets and electrically connected to a protector module when inserted into the socket, the improvement comprising:

a pair of outside-plant wires extending from one of the pairs of pins of each socket pattern, each of the pairs of outside-plant wires being twisted substantially along its entire length, the amount of twist of the pairs of outside-plant wires within each row differing from the amount of twist of adjacent pairs of outside-plant wires within the same row by at least about one-fourth turn per inch and from the amount of twist of adjacent pairs of outside-plant wires in adjacent rows by at least about one turn per inch; and a pair of customer premises wires extending from the other pair of pins of each socket pattern, each of the pairs of customer premises wires being twisted substantially along its entire length, the amount of twist of the pairs of customer premises wires within each row differing from the amount of twist of adjacent pairs of customer premises wires within the same row by at least about one-fourth turn per inch and from the amount of twist of adjacent pairs of customer premises wires in adjacent rows by at least about one turn per inch.

2. The protector panel according to claim 1, wherein the amount of twist of the outside-plant wires for each of the socket patterns is substantially the same as the amount of twist of the customer premises wires for the same socket pattern.

3. The protector panel according to claim 1, wherein the outside-plant wires for each of the socket patterns extend in one direction and the customer premises wires for the same socket pattern extend generally in an opposite direction so as to not overlie one another.

4. The protector panel according to claim 1, wherein the amount of twist of the outside-plant and customer premises wires is at least about 5 twists per inch.

5. The protector panel according to claim 1, wherein each of the socket patterns has two pairs of the pins.

6. A protector panel for telecommunication wires, the panel having a plurality of protector modules on a front side and comprising:

a plurality of rows of pins protruding from a back side of the panel, each of the pins being electrically connected to at least one of the protector modules and being arranged in pairs within a predetermined pattern generally corresponding to the protector modules;

an outside plant connector block and a customer premises connector block located on opposite sides of the rows of pins, the outside-plant connector block having a plurality of terminals adapted to be connected to wires of an outside plant cable, the customer premises connector block having a plurality of terminals adapted to be connected to wires leading to customer premises equipment;

a twisted pair of outside-plant jumper wires extending from one of the pair of pins of each protector module pattern to the outside-plant connector block, the amount of twist of the outside-plant jumper wires within each row differing from the amount of twist of adjacent outside-plant jumper wires within the same row by at least about one-fourth turn per inch;

a twisted pair of customer premises jumper wires extending from another of the pair of pins of each of the socket patterns to the customer premises connector block, the amount of twist of the customer premises jumper wires within each row differing from the amount of twist of adjacent customer premises jumper wires within the same row by at least about one-fourth turn per inch; and wherein the amount of twist of the outside-plant jumper wires leading to pins of adjacent protector module patterns within adjacent rows differs from one another by at least about one turn per inch, and the amount of twist of the customer premises jumper wires leading to pins of adjacent protector module patterns within adjacent rows differs from one another by at least about one turn per inch.

7. The protector panel according to claim 6, wherein the amount of twist of the outside-plant jumper wires for each of the protector module patterns is substantially the same as the amount of twist of the customer premises jumper wires for the same protector module pattern.

8. The protector panel according to claim 6, wherein the outside-plant jumper wires for each of the protector module patterns extend toward the outside-plant connector block and the customer premises jumper wires for the same protector module pattern extend generally in an opposite direction toward the customer premises connector block so as to not overlie one another.

9. The protector panel according to claim 6, wherein the twist within each of the outside-plant and customer premises jumper wires extends substantially throughout the entire length of each of the outside-plant and customer premises jumper wires.

10. The protector panel according to claim 6, wherein the amount of twist of the outside-plant and customer premises jumper wires is at least about 5 twists per inch.

11. A protector panel for telecommunication wires, comprising:

- a plurality of rows of sockets on a front of the panel, each of the sockets having two pairs of receptacles for receiving pins of a plug-in excess voltage module;
- a plurality of rows of pins protruding from a back of the panel, each of the pins registering with and being electrically connected to one of the receptacles so as to provide a socket pattern having two pairs of the pins;
- an outside plant connector block and a customer premises connector block located on opposite sides of the rows of pins, the outside-plant connector block having a plurality of terminals adapted to be connected to wires of an outside plant cable, the customer premises connector block having a plurality of terminals adapted to be connected to wires leading to customer premises equipment;
- a twisted pair of outside-plant jumper wires extending from one of the pair of pins of each socket pattern to the outside-plant connector block, the amount of twist of the outside-plant jumper wires leading to adjacent socket patterns within the same row differing from one another by at least about one-fourth turn per inch;
- a twisted pair of customer premises jumper wires extending from the other of the pair of pins of each of the socket patterns to the customer premises connector block, the amount of twist of the customer premises jumper wires leading to adjacent socket patterns within the same row differing from one another by at least about one-fourth turn per inch; and
- the amount of twist of the outside-plant and customer premises jumper wires leading to pins of adjacent socket patterns within adjacent rows differing from one another by at least about one turn per inch.

12. The protector panel according to claim 11, wherein the amounts of twist for the outside-plant and customer premises jumper wires are at least approximately 5.0 turns per inch.

* * * * *